United States Patent Office 3,126,884
Patented Mar. 31, 1964

3,126,884
METHOD OF PRESERVING ANIMAL TISSUE, SUCH AS BONE, INCLUDING METHOD OF MAKING BONE PASTE
Eli Jordan Tucker, Jr., 610 Medical Arts Bldg., Houston, Tex.
No Drawing. Filed Mar. 30, 1961, Ser. No. 99,584
5 Claims. (Cl. 128—1)

The present invention relates to a method of preserving animal bones and simultaneously encouraging cell growth during such preservation whereby such preserved bones may be transplanted without deleterious effects at later times to other living bodies, there to stimulate the host body to grow bone cells to unite with the graft; this application disclosing the present invention being a continuation-in-part of co-pending application Serial No. 411,043, filed February 18, 1954, for Method of Preserving Bones, such application having been abandoned. Also, this application disclosing the present invention is a continuation-in-part application of co-pending application Serial No. 534,174, filed September 13, 1955, for Preserved Tissue and Method of Tissue Preservation for Heterogeneous Grafts, such application now having been abandoned and also this application is a continuation-in-part application of co-pending application Serial No. 529,213, filed August 18, 1955, for Method of Preserving Bones Then Pulverizing Blending With a Plasma Clot, such application now having been abandoned. Also, this application is a continuation-in-part application of co-pending application Serial No. 48,688, filed August 10, 1960, for Method of Preserving Tissue, Such as Bone and now Patent No. 3,022,783.

Prior Patent No. 2,485,791, issued October 25, 1949, for Bone Bank and Method of Preserving Bones for Transplanation relates to a method of preserving and categorizing human bones for transplantation. Since custom, legislation and practical considerations restrict the supply from human sources of suitable tissues, such as bones, for preservation in accordance with the teachings of the above patent, it is desirable to provide a method of preserving tissue, such as bones, which may be derived from other than human sources and transplanted into humans without deleterious effects, and in manner to stimulate the host body to grow bone cells to units with the material of the graft. Accordingly, it is likewise desirable to arrive at body material sources which may be the sources of heterogeneous grafts between any species of animal, human and/or non-human.

In the preservation of body material or tissue such as the tissue comprising bones for use as the material of grafts, such as heterogeneous grafts, it is desirable to preserve the graft material in such fashion as to discourage the propagation of antigens or antibodies is discouraged and blocked, it has been found that the cells of body material grafted after having been thus preserved are not belabored by such antigens and antibodies which otherwise would adhere to the cells with an adherence in such manner as to militate against favorable reactions, or in such manner as to set up undesirable reactions between the body material to be grafted and the parent bed of the graft. Observations of results supporting this discovery have been made with body material thus preserved and used for grafting with the consequence that graft material thus preserved now supplies one of the most desirable sources of material for grafts in plastic and orthopedical surgery operations, and for operations related thereto.

In the preservation of such body material in refrigerated blood components, as in the presence of plasma or serum, the increased diminution and separation of such antigens and antibodies from the preserved cells take place in such manner that the antigens and antibodies pass off into the plasma or serum and eventually dwindle away under the metabolic action accompanying such conditions. To enhance such action it has been found that the blood component container in which the tissues are preserved should best not be filled completely with the component but rather an air space should be left a distance from the top of the container so that a volume of oxygen is provided therein which by oxygenation reaches those body material cells in state of preservation and in reaction causes the drawing off of the antigens and antibodies therefrom. Such oxygenation effect can be enhanced by controlled periodic or continuous agitation or oscillation of the container.

In such preservation of body material it is desirable that the preservation should be conducted in such a way that the growth of fibroblastic cells is encouraged in those types of tissues which produce cells of long life, such as, for instance, in the cells of bone. Following in order of longevity is cartilage, and then tendons. The preservation process also is extended in lesser degree to shorter lived cells, such as the cells of blood vessels, fascia, muscles, ureters, and cornea. At the end of the series, cells of still shorter life span, such as the cells of skin tissues and nerves can be preserved by such process although in many cases skin tissues and nerves are so short lived that the encouragement of cell growth in the preserving medium approaches the point of diminishing returns.

The osteogenic factor is now known to be a property of graft material, such as bone preserved after the teaching of this invention, and this factor stimulates the host to grow bone cells to unite with the graft. This factor has been present in all experiments involving the preservation of bone in refrigerated, unfrozen baths of blood components, such as plasma or serum from the same type of body as that furnishing the graft material. It has now become possible to recognize this factor for its great value in heterogenous bone grafting whereas previously it has been believed that heterogeneous grafts made after the teaching of this invention derived success because the method of preservation provided the bone graft material as a permeable bone structure so that it grew more rapidly than the bed of the graft.

As now viewed, the bone graft material in heterogeneous grafting provides a definitely developed property, now identified as such osteogenic factor, above referred to, which stimulates the formation of new or additional bone by the host. This factor or property has been present from the beginning of the experiments which have been carried out in perfecting this invention, and host bone growth can be apparent by taking and considering microscopic sections.

In detail this developed osteogenic factor in the graft bone has been found to consist of muco-protein and muco-polysaccharides of bone which react with the bone cells of the host to form new bone, the new bone cells finding sustenance on which they grow in such muco-protein and muco-polysaccharides of bone which the method of graft bone preservation has developed in its period of preservation in the plasma or serum bath.

One of the most important recent discoveries in the method of preserving various tissues, including bones, for subsequent heterogeneous grafting resides in finding that ingredient which will substantially enhance the depletion of antigens in the matter preserved, such ingredient comprising the addition of a *soluble sodium sulfonamide* to the bath to increase the hydrogen ion concentration of the bath accompanied by the production of a sodium salt linked with the protein preserved and in manner that the protein is double sulphur bonded to the amide ring of the said soluble sodium sulfonamide, the result comprising changing the protein to a less antigenic character.

In the field of the usage of bone preserved by this method it may be stored in preservation for a proper period of time and then pulverized without generating any undesirable degree of heat therein and hurled through a screen to reduce it to desired small particle size. Then the particles may be blended with plasma clot from the same type of animal as that supplying the bone and the mixture pressed to reduce the moisture content and thereafter such bone paste may serve effectively as a hemostatic in human operations or as a bridging agent in human crevices and sutures.

From the foregoing it can be stated that the invention has the consequent and obvious objects:

It is consequently a primary object of the present invention to so provide a method of preserving bones and/or other tissues of various animals whereby they may be transplanted at a later time to other living bodies.

Another object of the present invention is to provide a method of preserving animal bones and/or animal tissues in blood plasma or serum of the same type animal from which the bone or other tissue being preserved was obtained.

Still another object of the invention is to provide a method of simultaneously preserving animal bones and/or other tissues and encouraging new cell growth of the bone and/or other tissue during such preservation.

Another object of this invention is to provide a supply of preserved bones and/or other tissues which may be transplanted from one animal to another during surgery as required.

Still another object of the invention is to provide a method of preserving bones and/or other tissues by storing them in plasma or serum of the same type animal from which such bones and/or other tissues were obtained, whereby the bones and/or other tissues thus preserved will be maintained in a viable condition for transplanting to other animals, including humans at later times.

Still another object of the invention is to provide a method of encouraging fibroblastic cell growth on bones and/or other tissues which are being preserved for transplantation at a later time into another living body.

Still another object of the invention is to provide a method of encouraging fibroblastic cell growth on bones and/or other tissues which are being preserved for transplantation at a later time into another living body, wherein the bone and/or other tissue being preserved is maintained in normal saline and in the presence of an antibiotic agent in a solution including plasma or serum of the animal type from which the bone and/or other tissue preserved was removed.

A still further object of the invention is to provide a bone and/or tissue bank of various animal bones and/or tissues which are maintained in a medium of plasma or serum from the same type animals as the type of animals from which the bones and/or tissues are taken thereon in manner that they may be transplanted at later times to other living animal bodies.

It is also another important object of this invention to preserve bone and/or tissue in such manner as in a refrigerated body of blood components as plasma or serum from the same species of animal as that from which the bone and/or other tissue is taken and in normal saline, and in the presence of an antibiotic agent, in such a manner as to diminish and separate the antigens or antibodies from the preserved cells.

It is an additional object of this invention to enhance the operation of separating antigens or antibodies from the cells of the preserved bone and/or tissue by providing a volume of oxygen to react with the antibodies in their withdrawal and to provide for agitation of the container to further enhance the separative action of the oxygen with relation to the antigens and antibodies.

It is an additional object of this invention to preserve bone and/or other tissue in a medium for preservation in such a state as to encourage the growth of fibroblastic cells in the type of tissue having cells of longer longevity down to the point where the cells are so short-lived in certain types of tissues that a point of diminishing returns is reached where the encouragement of cell growth cannot render any results of consequential benefit.

It is yet a further object of this invention to provide a method of preserving bones for grafting in manner to develop an osteogenic factor consisting of muco-protein and muco-polysaccharides of bone whereby when the bone thus preserved is grafted such osteogenic factor stimulates the growth of the hose bone or bed for the graft.

It is a further and most important object of this invention to provide a preserved tissue, as bone and the like, so preserved as to greatly lessen the antigenic character of the matter preserved, such being accomplished by the addition of a *soluble sulfonamide component* to the bath to increase its hydrogen ion concentration and correspondingly to produce sodium salt linked with the protein tissue preserved which tissue in turn is bonded by a double sulphur bond to the amide ring of the sulfonamide thereby to change the protein to a less antigenic protein.

The invention also has as an important object the provision of a process of preserving bone in viable state in a plasma bath from the type of animal supplying the bone, pulverizing the bone to fine particles, drying the particles, mixing the bone with a plasma clot, and employing the mixture thus obtained to inhibit bleeding or as a filler or bridging element between bone sections to form fibroblastic and osteoblastic cells and to enhance the knitting together of the bone.

The present process is directed to preserving bone and/or other tissue from any warm blooded animal source, whereby it may be transplanted from one animal to the other or to humans without any deleterious effect to the parent bed to which it is transplanted. Such process is also directed in the case of tissue having cells of certain longevity such as bone tissue for encouraging new cell growth of the tissue during preservation which facilitates the ease with which such transplanted tissue integrates with the body onto which it is transplanted.

It is contemplated that tissue such as bone and/or other tissue from any suitable animal source may be used in practicing the invention including, by way of example, domestic animals such as sheep, bovine, hogs, dogs, cats and horses. However, regardless of source, and kind of tissue it must be removed from the body source under sterile conditions so as to inhibit contamination thereof by foreign matter or bodies which might cause harmful effects during its preservation or upon it being transplanted in its preserved state onto another body. Also, it is desirable that the tissue of whatever kind should be obtained promptly after death of the animal while it is still alive in order to inhibit deterioration. Also, it is desirable that only heathy tissue, free from disease, should be employed for preservation in order to prevent obvious harmful effects occurring during preservation or occurring later in the graft bed into which such preserved tissue is to be transplanted; therefore the donor animals must be tested to eliminate those with disease.

It is not necessary to classify the various animal bones and/or other animal tissues in the practice of this invention correspondingly as taught in Tucker Patent No. 2,485,791 wherein classification of human bones was made as to Rh factor and blood type, nor is it necessary in practicing the present invention to classify the blood of the original source as to type or characteristic. However, in order to preserve whatever kind of tissue which may be selected for grafting and in order to encourage and maintain new cell growth during the preservation thereof, it is necessary that the graft material be maintained in a plasma or serum solution, which plasma or serum must be from the same type animal as that of the graft material being preserved.

It has been determined that when tissue such as bone and/or other tissue is removed from the animal source and placed in a container with a solution of plasma or serum from the same type animal as the tissue to be preserved therein, new cell growth occurs during the period of preservation, so long as the plasma or serum furnishes proper nutrition for the material under preservation and to its cells.

Microscopic examinations of portions of the material under preservation may be made at suitable intervals to determine if the cells have begun to deteriorate, as by atrophy or necrosis in the case of cells of certain longevity. Such conditions, if noted upon examination, may be overcome and proper growth and life conditions for the particular tissue under preservation may be maintained by replenishing the container with a new and fresh supply of plasma or serum. The plasma or serum added must, of course, be of the same type animal as such particular tissue being preserved. To this extent it is necessary that proper indication of the kind of tissue in each container be noted at the same time that such tissue is removed from the source and placed in the container.

In practicing the invention, the tissue, such as bone and/or other tissue, when removed from the body source, is placed in a container of a suitable type such as glass and of a suitable size to accommodate the volume of the particular graft material to be preserved. However, any suitable storage material which is inert relative to the contents contained therein, and which will not deteriorate upon storage may be used.

The solution to be placed in the container may consist of plasma along with any suitable antibiotic such as penicillin or sodium sulfadiazene. The plasma used may be diluted up to 90 percent by volume with normal saline solution; however, since the maintenance of tissue life of any particular graft material is dependent upon the presence of sufficient plasma, a stronger solution may be used if the graft material is to be stored indefinitely. Also, use of a stronger solution, such as whole plasma, as an example, will eliminate the necessity of making frequent examinations of the graft material to determine if deterioration has occurred. Also, serum may be used in place of plasma in which case, however, the graft material will not be maintained viable as long as it would if plasma is used.

However, the combination which has proven best when calf bone has been used is 10% plasma. Also, penicillin is added along with mycostatin and a soluble sulphur salt such as soluble sodium sulphadiazene or preferably soluble sodium sulfonamide. After two weeks the bath is tested for bacteria cultures such as aerobes and anerobes, especially the Brucella anerobe. A second test is made at the end of two further weeks, and if such second test is negative the bone may be kept as long as three months without further test.

It has been determined that if the container contents are maintained at relatively low temperatures as compared with the normal body temperature of the body source of the graft material, the rate of depletion of nutrition from the plasma or serum to the graft material is materially reduced. However, if the temperature of container is frozen, it has been determined that any particular tissue sought to be preserved will die and will not become viable when such dead tissue is transplanted into a living body. Therefore, in order to reduce the intervals at which it may be necessary to replenish the plasma or serum in the container on the one hand, while on the other hand, maintaining the particular tissue being preserved viable, it has been determined that the optimum storage temperature is approximately 4½° C., but that higher refrigerating temperatures may be used.

It has also been discovered that all animal tissue such as bone and/or other kinds of tissue, when preserved as described herein, are not only miantained viable, but in the case of tissues of certain longevity as in the case of bone, for example, a fibroblastic cell growth is encouraged. As to this feature of fibroblastic cell growth notice should be taken that the fibroblastic cell is the most primitive of tissue cells and its maintenance and encouraged growth by immersion of the plasma or serum solution in the container should be especially recognized. It has also been found that preservation of such graft material, as bone and/or other tissue in a plasma or serum bath as hereinabove described also increases the growth of the periosteum or skin of the bone and also converts at least the peripheral osteocytes into fibroblastic tissue.

It should be further noted that the plasma or serum used is from the same type animal as the particular tissue being preserved although it is not necessary to provide the plasma or serum from the very same animal which served as the donor source for such tissue. For example, if oxen tissue is being preserved then any oxen plasma or serum may be used as the preserving medium, if horse tissue is being preserved then any horse plasma or serum may be used. On the other hand, oxen plasma cannot be used for successfully preserving tissue of a different kind of animal, such as a horse.

As a matter to be particularly noted in such preservation, it has been found that the antigens or antibodies which surround cells in peripheral proximity are drawn away from the graft material being preserved into the bath of plasma or serum to deteriorate therein as by the natural deterioration of metabolism.

To enhance this withdrawal of antigens or antibodies from the cells of the graft material under preservation it has been found desirable that the container should be of a size to contain the volume of material to be preserved inundated in the bath of plasma or serum with an air space of size being provided thereabove, such space approximating by volume say one-fourth of the volume of the bath.

It then follows that in due course of oxygenation the oxygen from the air will permeate the bath and react with the antigens or antibodies in such combinative manner as to hasten the dispersion and separation thereof into the plasma or serum bath.

It has been determined that tissues of various kinds, types and classes may be preserved by the hereinabove described processes, such tissues extending from those having long-lived cells as bones, cartilages, and tendons, to tissues of shorter cell life such as blood vessels, cornea, fascia, muscles, ureters, down to the shortest cell life tissues such as skin and nerves.

As a distinct enhancement of the process, including the enhancement of oxygenation and consequent increased withdrawal of the antigens or antibodies from the cells of the preserved tissue, it has been found advantageous to agitate the container at controlled intervals or at a controlled rate to thereby increase the oxygenation of the preserved graft material.

In cases where such graft materials have been employed in making heterogeneous grafts, the withdrawal of the antigens or antibodies from the particular graft material being preserved results in a graft material which will not react in opposition to the antigens or antibodies of the parent body receiving the tissue, and thus a better and more positively operable graft is obtainable than in the case of a graft made using a graft donation which has been freshly taken and not thus preserved.

Hereinabove it has been disclosed how tissue, including bones, may be preserved in a bath of blood components, such as plasma or serum, the bath being maintained in refrigerated state but above freezing, an antibiotic agent being used to prevent the growth of bacteria and the like. Subsequently, it has been discovered that the employment of a substance which may have antibiotic qualities but which additionally serves as a denaturizing agent will create a marked and novel effect in greatly discouraging the development of antigens. Such additional discovery consisted of applying a soluble sodium sulfonamide component to the bath of homologous serum or plasma in which the tissue, homologous to the bath, is to be preserved. With the tissue, as bone, kept in a homologous plasma or serum bath, the sodium salt from the soluble sodium sulfonamide becomes linked with the protein and the protein becomes double sulphur bonded to the amide ring of the said soluble sodium sulfonamide, with the result that the protein is converted to be much less antigenic.

As is well known, the absence of antigens results in a graft which will take *much more readily* than in the case of grafts preserved in the same manner but without a *soluble sodium sulfonamide* having been added to the bath.

In the making of bone paste it has been found best to use calf bone obtained under sterile conditions. Such bone is preserved in 10% bovine plasma which had added thereto penicillin and mycostatin and a soluble sulpha salt as soluble sodium sulfonamide. The bone is left in a refrigerator at about 40° F. for approximately two weeks and then bacterial cultures are taken to test for aerobes and anerobes, including the anerobe termed Brucella. If such tests are negative the bone is kept under preservation for two weeks longer and again tested and if these second tests are negative the bone is kept under preservation for a minimum period of three months and it is then taken out and pulverized with a minimum generation of heat. This is accomplished by a special mill having blades which cut instead of grinding the bone and then such blades force the bones through a screen to reduce it to 1/10 millimeter particle size. The speed of the mill is regulated to effect the generation of this minimum amount of heat so as not to cauterize the bone and thereby hamper its properties for use in projected surgical and dental operations.

After thus pulverizing the bone, it is desirable to mix it with a restraining agent and for this purpose any suitable plasma clot substance may be employed preferably in the amount of about 8% plasma clot by weight. To this end for example plasma of the animal supplying the bone is cooled, either slowly at about 40° F., or faster as by freezing. The clot results from the reaction between the prothrombin and thromboplastin from the plasma and the calcium from the bone to form thrombin, which in turn reacts with the fibrinogen of the plasma to form a fibrin clot. In mixing the plasma and bone careful sterile technique must be employed.

As to proportions, although 8% is a preferable proportion, it has been found that a suitable gel of pulverized bone and plasma clot substance can be made when the ratio of bone to plasma clot may approximate the ratio of 10 to 1, but other ratios may serve the purpose as well, it being necessary that the plasma clot is added in such proportions, as to provide a gel or restraining agent between the bone particles. For the purpose of obtaining a homogenized mixture, any suitable blender or mixer may be employed as a containing and mixing medium.

After mixing, the compound is placed in bags and pressed to force out the moisture, the moisture content thus being reduced to approximately 13%. Thereafter it is generally put in plastic syringes to market. While awaiting being marketed, such syringes are kept in refrigerated state and maintained therein under sterile conditions, a range of refrigerating temperatures from 40° F. to 50° F., serving to maintain the refrigerated state but successful refrigeration being also maintainable outside of this range limit. As may be required, additional plasma may in time be added to sustain the paste, and one example of accomplishing this would be enclosing the paste in an osmotic membrane which the plasma surrounds.

When incisions are made, as in the case of preparing a patient to receive bone preserved under the hereinabove described conditions for splints, bridging elements, or grafts, the introduction into the incision of the paste or admixture of ground or pulverized bone thus maintained, as mixed with a plasma clot substance, will result in an acceleration of the clotting action, since the organic calcium and phosphorous of the mixture combine in such presence with any uncombined portion of the plasma clot and also combine with constituents of the blood from the incision to form blood clots to lessen the bleeding from the incision.

The mixture also can serve as a bed or filler between bone sections as for example when such sections are being grafted. The viable paste will first grow fibroblastic cells which cells in turn develop into osteoblastic cells and serve, as does the whole bone preserved by this method, as a bridging element and conduit for nutrients until such time as replacement occurs in the course of metabolic action.

It has adaptability in dentistry as a filler for dental cavities, as for instance when the extraction of a tooth may be accompanied by the removal of parts of the jawbone. In such case it bridges the cavity and its growth of fibroblastic cells which develop into osteoblastic cells cooperates with the similar growth from the jawbone or molar parts until such time as replacement occurs in the due course of metabolism.

In summation the present process is directed to preserving tissues as bone and/or other tissues from any warm blooded animal source, whereby the tissue thus preserved may be transplanted into other types of animals or into humans without any deleterious effect to the graft bed onto which such tissue is transplanted.

Also, the invention further relates to a process for encouraging new cell growth as fibroblastic cell growth, and to the conversion of the peripheral osteocytes of a graft into fibroblastic tissue. Also in bone grafting it relates to a process which increases the growth of the periosteum or skin of the bone. Additonally the invention relates to the method of preserving tissue, as bones for grafting, in manner that the graft material develops an osteogenic factor which stimulates and sustains the growth of tissues, as bone, in the host body, as a body of a different species.

Most broadly the invention relates to a method of preserving tissue such as bone and/or other tissue of various types in plasma or serum from the same type animal as the tissue being preserved whereafter such material may be used at later times on other living human or animal bones.

The invention is stated not to be limited to the use of the exact materials of preservation set forth herein, nor to the exact number and sequence of method steps, but other materials and other method steps and sequences thereof are considered as well as such may fall within the broad spirit of the invention and within the broad scope of interpretation claimed for and merited by the appended claims.

What is claimed is:

1. A bone mixture of dumb animal bone of reduced antigenicity, of increased universal compatibility with human bone, and of encouraged cell growth during preservation, and for use in humans as a graft bridging element, dental cavity filler, hemostatic agent, and the like, said mixture comprising a healthy, viable, dumb animal bone cultured in a normal saline blood component bath in refrigerated state in the presence of a sodium sulfonamide compound, said blood component being derived from the type of animal from which the bone has been removed, said preserved bone including muco-protein and muco-polysaccharides rendered extraordinarily permeable by said bath, said bone being excessively antigen depleted and denatured by reaction producing sodium salt linked tissue protein which is amide ring bonded by double sulphur bonds, said bone also including osteoblastic bone tissue and growth produced periosteum converted in the bath from peripheral osteoblasts and also including growing bone tissue cells, said bone being pulverized to particle size and said mixture including plasma clot as a retaining agent for said particles, said clot comprising fibrin formed by the plasma fibrinogen reacting with the resultant of bone calcium reaction with the plasma prothrombin and thromboplastin.

2. A method of providing a cultured bone mixture of dumb animal bone of reduced antigenicity, of increased universal compatibility with human bone, and of encouraged cell growth during preservation, and for use in humans as a graft bridging element, dental cavity filler, hemostatic agent and the like, said method comprising the steps of testing animals for disease, removing bone from a tested healthy animal body under sterile conditions, placing the bone in a container having in normal saline therein a soluble sodium sulfonamide compound, and a blood component bath from the type of animal from which the bone has been removed, maintaining the container contents at temperatures substantially below normal body temperatures and above freezing, developing osteogenic factor, conditioned muco-protein and muco-polysaccharides of bone during preservation, increasing the hydrogen ion concentration of the bath during preservation by the reaction of the soluble sodium sulfonamide component of the bath with the bone to produce sodium salt linked with bone tissue protein bonded by a double sulphur bond to the amide ring whereby the protein is more denatured and less antigenic, converting peripheral osteocytes during preservation to osteoblastic bone tissue and increasing the growth of bone cells and periosteum, testing the preserved bone at intervals to observe for indications of atrophy and necrosis, replenishing when necessary the blood component with blood component from the type of animal from which the bone under preservation has been obtained, and pulverizing the bone thus maintained and blending it with a plasma clot as a retaining agent, said clot comprising fibrin formed by the plasma fibrinogen reacting with the resultant of bone calcium reaction with the plasma prothrombin and thromboplastin.

3. A bone mixture as claimed in claim 1 in which said blood component bath comprises serum.

4. A bone mixture as claimed in claim 1 in which said blood component bath comprises plasma.

5. The method of forming a bone paste of dumb animal bone of reduced antigenicity, of increased universal compatibility with humane bone, and of encouraged cell growth during preservation, and for use in humans as a graft bridging element, dental cavity filler, hemostatic agent and the like, said method comprising the steps of obtaining viable calf bone under sterile conditions, maintaining the calf bone in a container inundated in a bath of substantially 10% bovine plasma containing sodium sulfonamide, refrigerating the bath at substantially 40° F., whereby the sodium sulfonamide becomes linked with the protein of the bone and the protein becomes double sulphur bonded to the amide ring of the sodium sulfonamide thereby substantially reducing the antigenic character of the bone, testing after the bone has been in the bath at approximately two weeks apart for aerobes and anerobes including Brucella, thereafter leaving the bone in the bath under preservation for approximately three months, removing the bone and cutting it by mill blades to avoid cauterization and forcing it through to pulverize it to approximately 1/10 millimeter particle size, cooling bovine plasma whereby the reaction of the prothrombin and thromboplastin of the plasma with the calcium from the bone forms thrombin which in turn reacts with the fibrinogen of the plasma to form a fibrin clot, blending the fibrin clot with the bone particles in the proportion of from 7% to 10% plasma, reducing the moisture content of the mixture of plasma and bone particles to form a bone paste of approximately 13% moisture content and placing the paste in syringes to be employed as a filler or bridging agent in human operations.

References Cited in the file of this patent

UNITED STATES PATENTS

| | | |
|---|---|---|
| 2,485,791 | Tucker | Oct. 25, 1949 |
| 2,537,070 | Longfellow | Jan. 9, 1951 |
| 2,621,145 | Sano | Dec. 9, 1952 |